(No Model.)

H. A. ESTABROOK.
TRUSS.

No. 303,630. Patented Aug. 19, 1884.

Witnesses.
Henry Marsh.
Arthur Tipperton.

Inventor
Henry A. Estabrook
by Crosby & Gregory
Attys.

UNITED STATES PATENT OFFICE.

HENRY A. ESTABROOK, OF FITCHBURG, MASSACHUSETTS.

TRUSS.

SPECIFICATION forming part of Letters Patent No. 303,630, dated August 19, 1884.

Application filed January 23, 1884. (No model.)

*To all whom it may concern:*

Be it known that I, HENRY A. ESTABROOK, of Fitchburg, county of Worcester, State of Massachusetts, have invented an Improvement in Trusses, of which the following description, in connection with the accompanying drawings, is a specification, like letters on the drawings representing like parts.

My invention, relating to trusses, has for its object to render the trusses less liable to get out of adjustment in wearing. In trusses as usually constructed the pad is, when adjusted, rigidly fixed at the end of the spring and incapable of any movement with relation thereto, while the spring passing around the body is liable to be moved by the action of the wearer in breathing or making other movements, and such movement of the spring is apt to dislodge the pad and throw it out of adjustment, so that it will cease to have the proper effect on the rupture.

Figure 1:
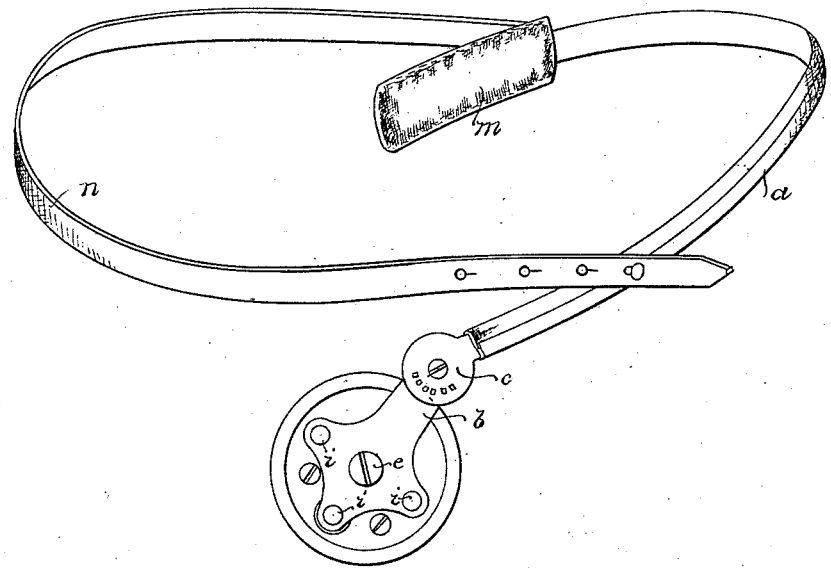
Figure 2:
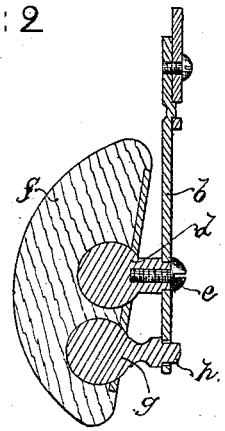

Figure 1 is a front view of a truss embodying my invention, and Fig. 2 a longitudinal section of the pad and its holding-arm.

The spring $a$ is of any suitable or usual construction, it being shown in this instance as properly shaped to pass in an inclined direction from the pad upward to and around the side of the body above the hip, and then downward again in an inclined direction across the back to a point opposite the front pad. The forward end of the spring $d$ is provided with a pad-holding arm swiveled thereto at $c$ in the usual manner to enable it to be adjusted in position with relation to the spring, and then securely and rigidly fastened in adjusted position. The said arm is provided with a pad-holding projection, $d$, fastened thereto by a screw, $e$, and having a spherical bearing portion entering a spherical socket in the pad $f$ near its middle, as shown in Fig. 2, so that the said pad may have a universal movement on the said holding projection, it never being fixed thereon. In order, however, to give the pad $f$ an inclined position with relation to its holding-arm $b$ at the end of the spring, as is generally required in adjusting it to the wearer, it is provided with an adjusting-support, $g$, having a spherical portion entering a spherical socket in the pad, near its edge, and having a neck somewhat longer than the neck of the pad-holding projection $d$, so that when the adjusting device $g$ is interposed between the pad and its holding-arm $b$, the said pad is inclined with relation to the said arm, as shown in Fig. 2. The neck of the pad-adjusting device $g$ has a reduced portion, $h$, to enter loosely any one of a series of sockets, $i$, in the arm $b$, as shown in Fig. 1, so that by loosening the screw $e$ the pad may be turned to place the portion $h$ of its adjusting device in any desired one of the sockets $i$, thus inclining the pad in any desired direction with relation to its holding-arm. The two ball-and-socket joints between the devices $d$ and $g$ and the pad permit a very large range of movement to the pad $f$ with relation to its holding-arm $b$, although the device $d$ and the screw $e$ confine the pad sufficiently to prevent the device $g$ from escaping from its socket in the arm $b$, so that with all its freedom of movement the pad always retains the same general inclination with relation to the said holding-arm $b$ and spring $a$. When a spring shaped to pass above the hip, as shown, is employed, the pad $m$, which bears at the rear of the body, should be elongated, as shown in Fig. 1, and the strap $n$, by which the spring is held in place upon the body, should be connected with the spring at some distance from its ends, as shown, as it then tends to keep the spring well up to the side of the body, while if the said strap were connected with the ends of the spring the portion of the spring which passes over the hip would be liable to fall away from the side of the body.

I claim—

The truss-spring $a$, the pad-holding arm $b$, provided with a series of sockets or holes, $i$, the pad $f$, centrally connected with said arms by means of a universal joint, combined with the adjusting device $g$, having an elongated neck, and reduced portion $h$ to engage the sockets or holes $i$ in the pad-holding arm, all substantially as and for the purpose described.

In testimony whereof I have signed my name to this specification in the presence of two subscribing witnesses.

HENRY A. ESTABROOK.

Witnesses:
JOS. P. LIVERMORE,
B. J. NOYES.